Patented Aug. 14, 1945

2,382,924

UNITED STATES PATENT OFFICE 2,382,924

SULPHONES OF THE AROMATIC SERIES AND A METHOD OF MAKING THE SAME

Rudolf Tschesche, Berlin-Wilmersdorf, Germany, assignor to Schering Corporation, Bloomfield, N. J., a corporation of New Jersey No Drawing. Application December 31, 1940, Serial No. 372,576. In Germany January 11, 1940

14 Claims. (Cl. 260—397.6)

This invention relates to sulphones of the aromatic series and more particularly to alkylated p,p'-diamino diphenyl sulphones and a method of making the same.

In U. S. application Serial No. 237,926, filed October 31, 1938, there is described and claimed a method for the manufacture of diamino diphenyl sulphone, comprising reacting salts of p-amino benzene sulphinic acids with halogenated nitro benzenes and subsequent reduction of the nitro compound obtained.

I have now found that, on starting also from sulphinic acids, mono-alkylated, especially methylated sulphones of the aromatic series, for instance, mono alkyl diamino diphenyl sulphones, may be obtained by way of the corresponding sulphoxides, by reacting sulphinic acids of the aromatic series, containing an amino group or a group convertible thereinto, suitably in p-position to the sulphinic acid group, with bases of the aromatic series, such as alkylated, especially methylated bases, for instance, with methylaniline and the like, and oxidizing the sulphoxide obtained, which itself is also physiologically effective, in the usual manner to the corresponding sulphone. Thereupon, if need be, the non-alkylated amino group is re-formed. Thus, sulphones of the general formula

X.R.SO₂.R'.NH.Y are obtained, in which R and R' represent aromatic residues, X an amino group or a group convertible thereinto and Y an alkyl, especially a methyl residue.

Instead of the sulphinic acids their halides or amides may be used for the reaction with the above-mentioned mono alkylated aromatic bases. In the case of using the amides the reaction is suitably carried out in the presence of hydrogen halide or with the hydrohalic salts of the corresponding bases. A process of this kind is described and claimed, for instance, in the copending application Serial No. 314,512.

The compounds claimed in the present application have proved extraordinarily effective against cocci infections; especially against streptococci; they are, for instance, more effective than the p,p'-diamino diphenyl sulphone, already known in this therapeutic field, while being considerably less toxic.

The following example serves to illustrate the invention, without, however, limiting the same to it.

EXAMPLE p'-Methyl amino-p-amino-diphenyl sulphone 100 gs. of p-acetyl amino-benzene sulphinic acid are heated on the water bath with 150 gs. of methyl aniline for 6–8 hours, thereby forming a violet colored solution from which the excess of methyl aniline is driven off by steam. The oily residue is recrystallized from methanol after pouring off the aqueous layer. The p-methyl amino-p-acetyl amino diphenyl sulpoxide with a melting point of 183–185° C. is obtained thereby. Yield about 70 gs.

70 gs. of the sulphoxide are heated on the water bath with 140 gs. of acetic acid anhyride for 30 minutes. While cooling, a solution of 26 gs. of chromic acid anhydride in as little water as possible is added drop by drop into the solution, which has previously been diluted with 100 ccs. of glacial acetic acid. After heating on the water bath for another half hour, the green solution is poured into two liters of water. Thereby an oily precipitate is formed, which, after a short time, crystallizes and may be filtered off by suction. For purification the p-acetyl-amino-p'-acetyl methyl amino diphenyl sulphone obtained may be recrystallized from ethanol.

In order to split off the acetyl group the p-acetyl-amino-p'-acetyl methylamino diphenyl sulphone is suspended in 250 ccs. of methanol and heated with 50 gs. of potassium hydroxide for 12 hours on the water bath. As soon as the saponification is finished, the solution is poured into water, after driving off part of the methanol. The p-amino-p'-methyl amino diphenyl sulphone precipitated is recrystallized from ethanol. Melting point 165° C. Yield about 40 gs.

Instead of p-acetyl amino benzene sulphinic acid other derivatives of benzene sulphinic acid wherein the amino group is replaced by a group which can be re-converted into an amino group, such as the nitro, azo, hydrazo, group, halogen and the like may be used as the one reaction component. These groups are transformed into the amino group by the aid of reduction and/or hydrolysis. Likewise, instead of the corresponding sulphinic acids the sulphinic acid halides, such as the chloride, or also the sulphinic acid amides may be employed as starting material.

Instead of methyl aniline other aromatic bases may be used as the other reaction component such as other alkylated anilines or aniline itself or the like. When starting with the corresponding sulphinic acid amides it is advisable, as has been mentioned before, to use the salts of the aromatic bases with hydrogen halides, such as the chlorhydrate of methylaniline and the like.

Of course, many changes and variations in the reaction conditions, the starting materials used, the reaction temperature and duration, the methods of isolating and purifying the final products and so forth may be employed by those skilled in the art, provided they are used in accordance with the principles set forth herein and in the claims annexed hereto.

What I claim is:

1. p-Amino-p'-methyl amino diphenyl sulphone having a melting point of 165° C. and corresponding to the following formula

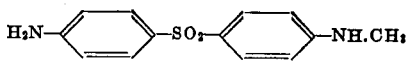

2. p-Acetyl amino-p'-acetyl-methylamino diphenyl sulphone corresponding to the following formula:

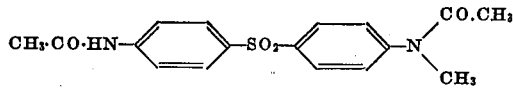

3. p-Amino-p'-alkylamino diphenyl sulphones of the general formula

wherein Alk represents an alkyl group.

4. p-Acylamino-p'-alkylamino diphenyl sulphones of the general formula

Ac.NH.C₆H₄.SO₂.C₆H₄.NH.Alk wherein Alk represents an alkyl group and Ac the acyl group of a carboxylic acid.

5. A method for making sulphones of the aromatic series of the following formula:

X.R.SO₂.R'.NHY wherein R and R' represent phenyl radicals, X a member of the group consisting of the amino group, an acylamino group, and the nitro group, and Y an alkyl residue, comprising reacting a sulphinic acid compound of the general formula X.R.SO.Y', wherein X is in the p-position and Y' stands for a member of the class consisting of OH, halogen, and NH₂, with an organic base of the general formula R'.NHY, and oxidizing the sulphoxide obtained to the corresponding sulphone.

6. A method according to claim 5, wherein methyl aniline is used as the second reaction component.

7. A method for making sulphoxides of the aromatic series of the following formula

X.R.SO.R'.NHY wherein R and R' represent phenyl radicals, X a member of the group consisting of the amino group, an acylamino group, and the nitro group, and Y an alkyl residue, comprising reacting a sulphinic acid of the general formula X.R.SO₂H, wherein X is in the p-position, with an organic base of the general formula R'.NHY.

8. A method for making sulphones of the aromatic series of the following formula:

X.R.SO₂.R'.NHY wherein R and R' represent phenyl radicals, X an acylamino group, and Y an alkyl residue, comprising reacting a sulphinic acid of the general formula X.R.SO₂.H, wherein X is in the p-position, with an organic base of the general formula R'.NHY, and oxidizing the sulphoxide obtained to the corresponding sulphone.

9. A method for making sulphones of the aromatic series of the following formula:

X.R.SO₂.R'.NHY wherein R and R' represent phenyl radicals, X a member of the group consisting of the amino group, an acylamino group, and the nitro group, and Y an alkyl residue, comprising reacting a sulphinic acid halide of the general formula X.R.SO.Hal, wherein X is in the p-position and Hal stands for halogen, with an organic base of the general formula R'.NHY, and oxidizing the sulphoxide obtained to the corresponding sulphone.

10. A method for making sulphoxides of the aromatic series of the following formula:

X.R.SO.R'.NHY wherein R and R' represent phenyl radicals, X a member of the group consisting of the amino group, an acylamino group, and the nitro group, and Y an alkyl residue, comprising reacting a sulphinic acid halide of the general formula X.R.SO.Hal, wherein X is in the p-position, and Hal stands for halogen, with an organic base of the general formula R'.NHY.

11. A method for making sulphones of the aromatic series of the following formula:

X.R.SO₂.R'.NHY wherein R and R' represent phenyl radicals, X a member of the group consisting of the amino group, an acylamino group, and the nitro group, and Y an alkyl residue, comprising reacting a sulphinic acid amide of the general formula X.R.SO.NH₂, wherein X is in the p-position, with an organic base of the general formula R'.NHY in the presence of a hydrogen halide, and oxidizing the sulphoxide obtained to the corresponding sulphone.

12. A method for making sulphones of the aromatic series of the following formula:

X.R.SO₂.R'.NHY wherein R and R' represent phenyl radicals, X a member of the group consisting of the amino group, an acylamino group, and the nitro group, and Y an alkyl residue, comprising reacting a sulphinic acid amide of the general formula X.R.SO.NH₂, wherein X is in the p-position, with a hydrogen halide salt of an organic base of the general formula R'.NHY, and oxidizing the sulphoxide obtained to the corresponding sulphone.

13. A method for the manufacture of sulphones of the aromatic series of the formula

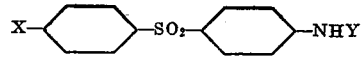

wherein X is a member of the group consisting of the amino group, an acylamino group, and the nitro group, and Y an alkyl radical, comprising reacting a sulphinic acid compound of the general formula

wherein Z' represents a group capable of splitting off with hydrogen and selected from the class consisting of hydroxyl, halogen and the amino group, with an organic base of the general formula

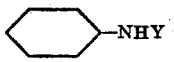

to form a sulphoxide compound, and oxidizing the latter to the corresponding sulphone.

14. In a process for the manufacture of sulphoxy compounds of the aromatic series, the step which comprises reacting a sulphinic acid compound of the general formula

wherein X is a member of the group consisting of the amino group, an acylamino group, and the nitro group and Z' a group capable of splitting off with hydrogen and selected from the class consisting of hydroxyl, halogen and the amino group, with an organic base of the general formula

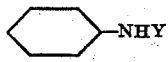

wherein Y is an alkyl radical, to form the corresponding diphenyl sulphoxide compound.

RUDOLF TSCHESCHE.